United States Patent
Venditti et al.

(10) Patent No.: US 6,814,561 B2
(45) Date of Patent: Nov. 9, 2004

(54) APPARATUS AND METHOD FOR EXTRUSION OF THIN-WALLED TUBES

(75) Inventors: James Venditti, Somerset, NJ (US); Howard Wolek, Morris Plains, NJ (US); Alice Wong, Fort Lee, NJ (US); David J. Sogard, Edina, MN (US); Jason P. Hill, Brooklyn Park, MN (US); Timothy S. Girton, Maple Grove, MN (US); Christopher B. Brodeur, Andover, MN (US)

(73) Assignee: SciMed Life Systems, Inc., Maple Grove, MN (US)

( * ) Notice: Subject to any disclaimer, the term of this patent is extended or adjusted under 35 U.S.C. 154(b) by 396 days.

(21) Appl. No.: 10/012,825

(22) Filed: Oct. 30, 2001

(65) Prior Publication Data

US 2003/0082323 A1 May 1, 2003

(51) Int. Cl.⁷ .............................................. B29C 47/20
(52) U.S. Cl. ..................... 425/326.1; 425/380; 425/467
(58) Field of Search .............................. 425/326.1, 380, 425/467

(56) References Cited

U.S. PATENT DOCUMENTS

| | | | |
|---|---|---|---|
| 2,566,293 A | 8/1951 | Robinson | 425/197 |
| 3,260,774 A | 7/1966 | Harlow | 264/28 |
| 3,953,566 A | 4/1976 | Gore | 264/505 |
| 4,126,661 A | 11/1978 | Fulconis et al. | 264/209.6 |
| 4,208,745 A | 6/1980 | Okita | 623/1.4 |
| 4,225,547 A | 9/1980 | Okita | 264/127 |
| 4,482,516 A | 11/1984 | Bowman et al. | 264/127 |
| 4,547,142 A | 10/1985 | Arenhövel et al. | 425/378 R |
| 4,655,771 A | 4/1987 | Wallsten | 623/1.22 |
| 4,743,480 A | 5/1988 | Campbell et al. | 428/36.5 |
| 4,791,966 A | 12/1988 | Eilentropp | 138/154 |
| 4,806,086 A | 2/1989 | Bloch et al. | 425/114 |
| 4,828,770 A | 5/1989 | Fabian et al. | 264/40.3 |
| 4,850,999 A | 7/1989 | Planck | 623/1.44 |
| 4,861,256 A | 8/1989 | Covey | 425/378.1 |
| 4,925,710 A | 5/1990 | Buck et al. | 428/34.5 |
| 4,954,126 A | 9/1990 | Wallsten | 600/36 |
| 5,061,275 A | 10/1991 | Wallsten et al. | 623/1.22 |
| 5,064,435 A | 11/1991 | Porter | 623/23.7 |
| 5,071,407 A | 12/1991 | Termin et al. | 604/104 |
| 5,112,900 A | 5/1992 | Buddenhagen et al. | 524/484 |
| 5,123,917 A | 6/1992 | Lee | 623/22.26 |
| 5,147,385 A | 9/1992 | Beck et al. | 128/898 |
| 5,156,785 A | 10/1992 | Zdrahala | 264/108 |
| 5,221,261 A | 6/1993 | Termin et al. | 604/104 |
| 5,234,456 A | 8/1993 | Silvestrini | 623/1.2 |
| 5,282,823 A | 2/1994 | Schwartz et al. | 623/1.22 |

(List continued on next page.)

FOREIGN PATENT DOCUMENTS

| | | |
|---|---|---|
| DE | 39 18 736 A1 | 12/1990 |
| EP | 0 551 179 A1 | 7/1993 |
| EP | 0 621 015 A1 | 10/1994 |

(List continued on next page.)

OTHER PUBLICATIONS

Copy of Search Report issued on Dec. 18, 2002 for International Application No. PCT/US 02/27437.

*Primary Examiner*—Robert Davis
*Assistant Examiner*—Joseph S. Del Sole
(74) *Attorney, Agent, or Firm*—Hoffmann & Baron, LLP

(57) ABSTRACT

The present invention provides an apparatus and method for manufacturing polymeric thin-walled tubular members, which are well-suited for use as vascular grafts. The apparatus of the present invention enables extrusion of a tubular member having an extremely thin wall thickness so as to facilitate passage through tortuous vascular passageways. The apparatus achieves uniform wall thickness in a tubular member by establishing and maintaining axial alignment of a ram having a concentrically disposed guide rod therein with a die supported in concentric relation to the guide rod.

54 Claims, 8 Drawing Sheets

U.S. PATENT DOCUMENTS

| | | | |
|---|---|---|---|
| 5,282,824 A | 2/1994 | Gianturco | 623/1.13 |
| 5,378,239 A | 1/1995 | Termin et al. | 604/104 |
| 5,505,887 A | 4/1996 | Zdrahala et al. | 264/127 |
| 5,591,226 A | 1/1997 | Trerotola et al. | 623/1.12 |
| 5,607,468 A | 3/1997 | Rogers et al. | 128/898 |
| 5,607,478 A | 3/1997 | Lentz et al. | 623/23.69 |
| 5,609,624 A | 3/1997 | Kalis | 623/1.32 |
| 5,628,782 A | 5/1997 | Myers et al. | 623/2.25 |
| 5,628,786 A | 5/1997 | Banas et al. | 623/1.13 |
| 5,628,788 A | 5/1997 | Pinchuk | 623/1.2 |
| 5,639,408 A | 6/1997 | King et al. | 264/103 |
| 5,641,443 A | 6/1997 | Calcote et al. | 264/127 |
| 5,645,559 A | 7/1997 | Hachtman et al. | 623/1.2 |
| 5,653,745 A | 8/1997 | Trescony et al. | 623/1.29 |
| 5,667,523 A | 9/1997 | Bynon et al. | 623/1.13 |
| 5,700,285 A | 12/1997 | Myers et al. | 623/1 |
| 5,718,973 A | 2/1998 | Lewis et al. | 623/1.32 |
| 5,735,892 A | 4/1998 | Myers et al. | 623/1 |
| 5,749,880 A | 5/1998 | Banas et al. | 606/198 |
| 5,788,626 A | 8/1998 | Thompson | 623/1.15 |
| 5,810,870 A | 9/1998 | Myers et al. | 606/198 |
| 5,843,166 A | 12/1998 | Lentz et al. | 623/1.13 |
| 5,874,032 A | 2/1999 | Zdrahala et al. | 264/127 |
| 5,965,074 A | 10/1999 | Aubertin et al. | 264/112 |
| 5,993,489 A | 11/1999 | Lewis et al. | 623/1.13 |
| 6,000,927 A | 12/1999 | Glowacki et al. | 425/190 |
| 6,027,779 A | 2/2000 | Campbell et al. | 428/36.91 |
| 6,050,805 A | 4/2000 | Lupke | 425/326.1 |
| 6,224,803 B1 | 5/2001 | Tiernan | 264/166 |

FOREIGN PATENT DOCUMENTS

| | | |
|---|---|---|
| WO | WO 87/04935 | 8/1987 |
| WO | WO 95/05131 | 2/1995 |
| WO | WO 95/05132 | 2/1995 |
| WO | WO 95/05555 | 2/1995 |
| WO | WO 96/00103 | 1/1996 |
| WO | WO 96/28115 | 9/1996 |
| WO | WO 96/40001 | 12/1996 |
| WO | WO 97/07751 | 3/1997 |

APPARATUS AND METHOD FOR EXTRUSION OF THIN-WALLED TUBES

FIELD OF THE INVENTION

The present invention relates generally to an apparatus and method for manufacturing a thin-walled tubular member, well-suited to form an implantable prosthesis that is used to repair and/or replace or otherwise treat a vascular defect. More particularly, the present invention relates to an extrusion apparatus having a concentrically supported die for extrusion of extremely thin-walled tubular members, such apparatus employing an extrusion method that avoids deformation, warping, disfigurement, asymmetry and other distortions of the tubular member produced thereby.

BACKGROUND OF THE INVENTION

Extrusion encompasses a plurality of well-known processes that feature low tooling and labor costs, making extrusion a desirable machining process especially for tubular profiles. During an extrusion process, a solid polymer (i.e., pellets, chips, beads, powder and the like) is generally fed through a transport section into a rotating screw or extrusion pipe via a feeder or hopper. Plastic is slowly heated as it is pressed forward toward a die, becoming a homogeneous melt that is subsequently forced through the die to form a continuous-length shape. Once cooled, the extrusion is cut and shaped to a desired length and configuration.

Ram extrusion is a specific extrusion method that utilizes pressure sintering for the continuous production of profiles from high-molecular-weight polymers. A ram forces a preformed mass of polymeric material, such as pre-compressed powder, into a die (typically heated) having the requisite cross-section. The individual particles of the mass sinter together under the effects of heat and pressure to generate an extrudate.

Achievement of a desirably thin tube is impaired due to the limitations of conventional extrusion processes. It is desirable to maintain uniform wall thickness during an extrusion process and provide generous radii that improve the flow of the composition through the die and reduce stresses associated therewith, thereby significantly reducing the cost and improving the consistency of the product. For instance, maintaining the uniformity of the wall thickness helps to maintain the maximum running speed of the extruder and the straightness of the part. Because extruded parts are only contained by the metal at the die, they tend to move or sag downline to the detriment of product uniformity. Although it is relatively easy to manipulate the physical and mechanical properties of the material to match performance specifications, it remains nonetheless difficult to manipulate thin-walled members due to the flexible nature of the resultant extruded product.

Additionally, a common problem encountered during extrusion is deviation of tubular thickness and center deviation during the extrusion process. In a ram extrusion apparatus, the die not only shapes the final extrudate, but it also determines the quality of the extrudate by the combined effects of pressure and temperature. Generally, extrusion dies for hollow profiles consist of an extrusion pipe, a mandrel and a ram. In the extrusion of hollow profiles such as tubes, dense powder must slide over two surfaces (i.e., those of the extrusion pipe and the mandrel), thereby inducing escalated pressure during the extrusion of prior art tubes (having relatively thin walls in the range of 2–3 mm thickness) and counter pressure due to friction. Extrusion pressures are thus higher for such relatively thin prior art profiles than those experienced for solid profile extrusion or tubular profiles with increased wall thickness. As a result, when extruding materials, there is an inherent risk of exceeding the upper pressure limit of the powder and getting tablet formation, especially during cooling when the extrudate shrinks onto the mandrel. In addition, the critical components of extrusion equipment (e.g., mandrel; extrusion pipe; die) are subjected to high forces and pressure which cause relative movement between the components. Such relative movement typically results in some off-center, eccentric alignment which is acceptable when extruding relatively thick-walled tubular members. However, with thin-walled structures, the eccentric off-set may cause insufficient material to be directed to a portion or portions of the resulting extrudate. Accordingly, wall portions may result which are unacceptably too thin and/or include discontinuities. Thus, continuous maintenance of the alignment of key extruding elements is critical in forming thin-walled members.

A beneficial material that is widely used in extrusion applications, including ram extrusion, is polytetrafluoroethylene (PTFE). PTFE undergoes cold flow so as to change dimension when pressure is applied, even at room temperature. PTFE can be extruded from a resin powder mixed with a liquid lubricant or from a conventional paste. When properly processed, PTFE exhibits superior properties inherent in fluoropolymer resins, such as non-aging characteristics, chemical inertness, heat resistance, toughness and flexibility, low coefficient of friction, negligible moisture absorption, improved resistance to deformation under load and minimal sagging when in billet form. Beyond PTFE, most polymeric materials are suitable for extrusion, including but not limited to high density and low density polyethylene, rigid and flexible polyvinylchloride, polypropylene, polyurethane, thermoplastic rubber, acrylic, cellulose acetate butyrate, polycarbonate, polyethersulfone and polyphenylene sulfide.

One technique for forming PTFE tubing is to use a wet flow paste extrusion process. The paste extrusion process yields a "green tube" that is then subjected to secondary operations such as heating, expansion and sintering to yield an expanded PTFE (ePTFE) tube having a porous node and fibril structure. The green tube produced by the prior art paste extrusion process has a relatively thick wall and a small internal diameter, and the resultant ePTFE tube exhibits a relatively thick wall thickness. It is desired to obtain structurally-sound thin-walled tubes having thinner walls than that found in the prior art. It is especially desired to obtain thin-walled PTFE green tubes and ePTFE tubes which can be used in medical applications, such as with grafts and stent/grafts.

It is therefore desirable to provide a mechanism and associated method for repeatedly and predictably producing an elongate tubular member having a very thin wall thickness. Such a member is conducive to employment in a variety of applications wherein prolonged patency of the tube complements inherent circumferential strength without compromising a need for minimal wall thickness.

SUMMARY OF THE INVENTION

It is an advantage of the present invention to manufacture thin-walled tubular members in an inexpensive and easily executed extrusion process.

It is a further advantage of the present invention to extrude tubular elements having a very thin circumferential wall of uniform thickness.

It is still a further advantage of the present invention to extrude such thin-walled tubular members while preserving the structural integrity of the member.

It is yet another advantage of the present invention to execute a process for the extrusion of thin-walled tubular members via an apparatus having concentrically supported extruder elements.

In the efficient attainment of these and other advantages, the present invention provides an extrusion apparatus and method for manufacturing a generally tubular profile with a thin-walled structure. The apparatus is well-suited to extrude polymeric compositions, such as PTFE in forming prostheses.

The extrusion apparatus includes an assembly having a plurality of successively spaced support platens interconnected by a plurality of truss members. The truss members maintain the platens in a parallel arrangement. Each support plate includes a central aperture therethrough such that alignment of the plates effects axial alignment of their central apertures.

A generally cylindrical guide rod is threaded through the support plates in concentric relation with a ram supported therearound. Such ram includes a piston at an extent thereof that is disposed in a bore of a barrel. An annular wiper element is also mounted onto the ram and positioned adjacent the piston so as to ensure additional concentric support of the guide rod in relation to the ram and further in relation to the barrel. The guide rod extends the length of the barrel to a front extruder plate at which a die is coupled to the barrel by a die-mounting collar positioned annularly therearound. A mandrel is formed at a tip portion of the guide rod, the mandrel extending at least partially into the orifice of the die. Advantageously, the guide rod, the barrel and the ram are supported concentrically such that these elements share a common longitudinal axis with the central apertures of the support plates. The support is maintained so that movement of the guide rod relative to other elements is generally constrained and a relatively constant annular gap is maintained between the guide rod and the barrel.

Preferably, the extrudate passageway tapers into the desired outer diameter of the die, wherein the outer diameter dimension is maintained. In addition, it is preferred that the mandrel be flexibly formed, or be flexibly connected to the guide rod so as to be movable relative thereto. As such, the mandrel has the ability to adjust during an extrusion process and self-center. With the ram forcing the pre-form through the die, and about the mandrel, the mandrel is able to self-center in response to the pressure of the pre-form being relatively-evenly applied circumferentially about the mandrel. The self-centering effect ensures proper alignment of the mandrel relative to the die, which is especially critical in forming extremely thin-walled tubing.

In operation, a pre-form billet of selected polymeric material is placed within the barrel at the front end thereof. Steady movement of the ram effects corresponding movement of the piston, thereby inducing pressure and heat on the billet as the piston moves through the bore around the guide rod. The resultant pressure and heat cause the billet to become a flowable extrudate that traverses a circumferential periphery of the guide rod and mandrel for delivery of a resultant thin-walled tubular profile through an exit opening in the die. Because of the inventive arrangement, the extruded tube is formed with uniform wall thickness. The method and apparatus of the subject invention overcome deficiencies of the prior art and allow for extremely thin-walled tubular structures to be uniformly extruded.

DETAILED DESCRIPTION OF THE PREFERRED EMBODIMENT

The present invention provides an apparatus and method for manufacturing polymeric tubular members, which are well-suited for use as vascular grafts. The apparatus of the present invention enables extrusion of a tubular member having an extremely thin-wall thickness so as to facilitate passage through tortuous vascular passageways. The apparatus achieves uniform wall thickness in a tubular member by establishing and maintaining axial alignment of a ram having a concentrically disposed guide rod therein with a die supported in concentric relation to the guide rod.

Now referring to the figures, wherein like elements are identically numbered, the configuration and operation of the present invention can be described.

Figure 1:
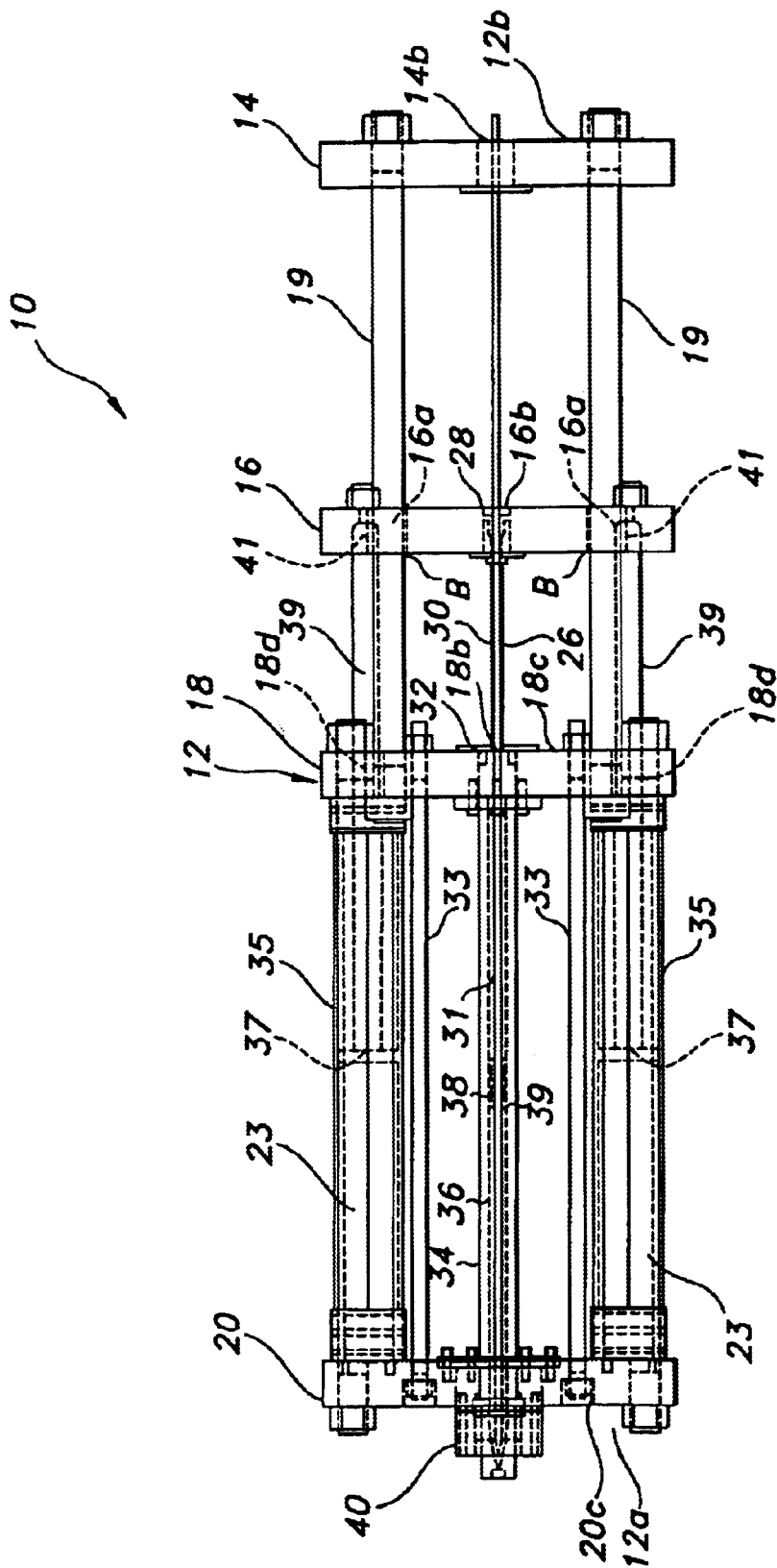
FIGS. 1 and 2 show top and side views of an extrusion apparatus of the present invention having concentrically supported extruder elements disposed therewithin.
Figure 2:
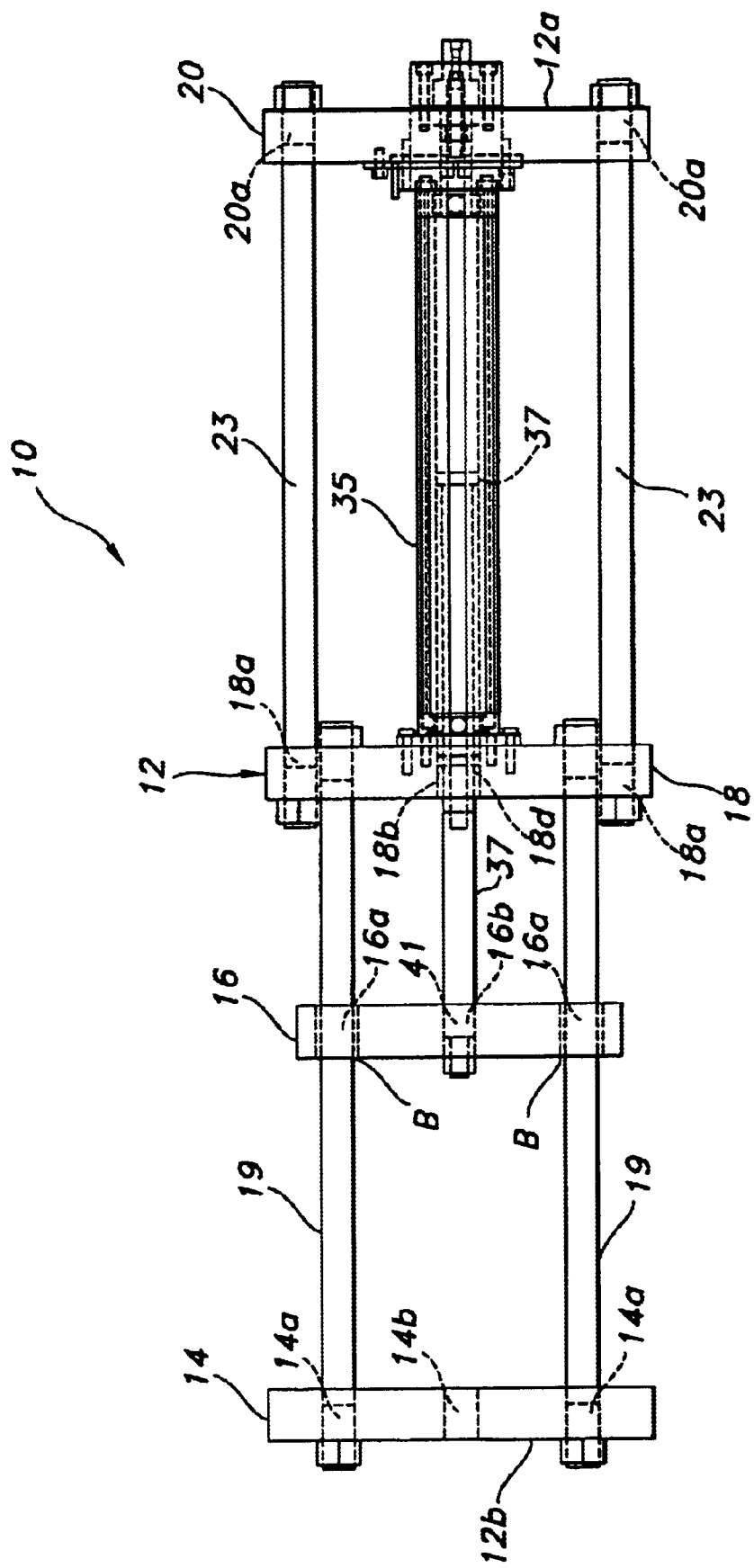

Specifically referring to FIGS. 1 and 2, an extruder 10 of the present invention is provided for the extrusion of a pre-form (i.e., billet) of polymeric material into a thin-walled tubular member. The choice of raw material is an important factor affecting the final extruded product, and there are certain requirements of the raw material that should be fulfilled so as to optimize extrusion. Such requirements include, but are not limited to, good free flowability, high packing density and granule stability and hardness that is suitable for the application. Desirable materials that meet such requirements include high molecular weight polymers such as fluoropolymers, particularly, polytetrafluoroethylene (PTFE), that feature low water absorption, reduced friction and easy sterilization. Although reference is made herein to PTFE, it is understood that any polymeric composition may be incorporated that is compatible with operation of the present invention.

Figure 3:
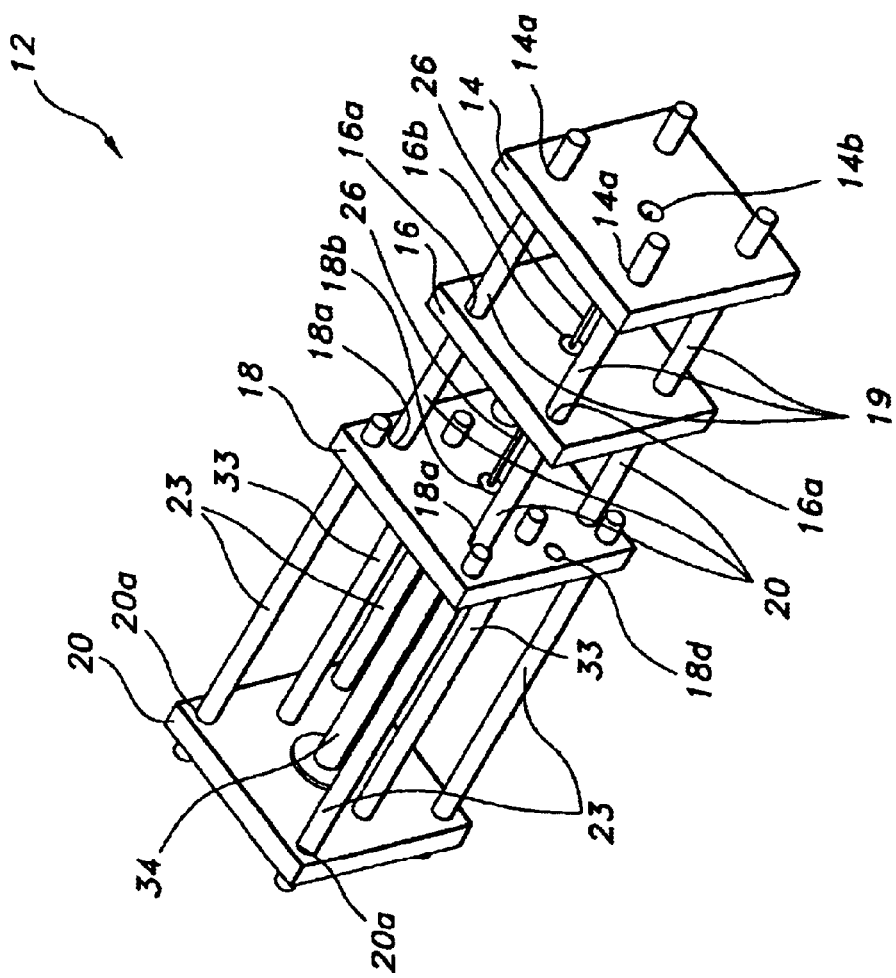
FIG. 3 shows a perspective view of an extrusion mold assembly used in connection with the subject invention.

Extruder 10 includes an extrusion mold assembly 12 (separately illustrated in FIG. 3) that provides a scaffolding for effective concentric support of requisite extruder elements thereby. Assembly 12, having a forward end 12a and a rearward end 12b, generally includes a series of platens including stationary platens 14 and 18 and traverse platen 16. Platens 14 and 18 are secured to one another in spaced alignment by a plurality of primary truss members 19.

As shown in the Figures, four of the truss members 19 are utilized, although other quantities may be used. It is preferred that the platens 14, 18 be generally rectangular and that the truss members 19 be secured in orifices 14a, 18a respectively, in proximity to the corners of the platens 14, 18. Preferably, the truss members 19 are countersunk into the platens 14, 18, as more fully described below. With this arrangement, strong perimetric support for the platens 14, 18 may be provided which will maintain the platens 14, 18 in a desired parallel arrangement.

The traverse platen 16 is formed with orifices 16a and is disposed in sliding engagement on central body portions 19a of the truss members 19 with the respective central body portions 19a passing through the orifices 16a. As is known to those skilled in the art, slide bearings B may be mounted in the orifices 16a to aid in sliding movement. It is critical to maintain parallelism between the traverse platen 16 and the platens 14, 18. Thus, it is desired that the slide bearings B be provided with relatively small clearances relative to the truss members 19, thus, minimizing twisting of the platen 16 during movement and maintaining parallelism.

Each of platens 14, 16 and 18 further includes a central aperture 14b, 16b, and 18b, respectively, therein to accommodate passage of extruder elements therethrough. Platens 14, 16 and 18 are notably coupled in parallel alignment so as to ensure corresponding parallel alignment therebetween for maintaining concentricity of the extruder elements throughout an extrusion cycle.

A front extruder plate 20 is also provided that similarly includes a plurality of orifices 20a defined therethrough to accommodate insertion of corresponding secondary truss members 23. Plate 20 also includes a central aperture 20b that accommodates passage of extruder members, as further described hereinbelow. Secondary truss members 23 are similarly formed to the truss members 19 and are secured to the plate 20 and the platen 16 through countersunk connections to maintain a parallel arrangement therebetween, also as described below. Truss members 23 not only provide support for plate 20, but also ensure parallel arrangement of the plate 20 and the platens 14, 16, 18 and maintain coaxial alignment of apertures 14b, 16b, 18b and 20b.

Now referring particularly to FIGS. 1 and 2, a preferred configuration of concentric extruder elements may be described. Aperture 14b of plate 14 insertably accommodates a free extent of a guide rod 26 therethrough. Guide rod 26 is an elongate, generally cylindrical member traversing a length of assembly 12 in concentric relation with orifice 14b. Guide rod 26 is at least partially retained in such relation by guide rod bushing 28 that is annularly disposed in orifice 16b of traverse platen 16. Guide rod 26, is preferably hollow, but may be formed solid.

Guide rod 26 linearly extends in concentric relation through orifice 16b so as to be coaxially disposed within tubular ram 30 and more particularly in a bore 31 defined along a longitudinal axis thereof. Ram 30, along with guide rod 26, extend in coaxial relation through an elongate barrel 34 having a bore 36 defined therewithin. Ram bushing 32, that is positioned adjacent rear surface 18c of plate 18, circumscribes a periphery of ram 30 so as to maintain the coaxial relation of ram 30 relative to the barrel 34.

Ram 30 is coupled with piston 38 that is also disposed inside bore 36. An annular wiper element 39 is mounted onto the ram 30 and disposed adjacent to piston 38 so as to provide additional concentric support of the guide rod 26 in relation to the ram 30 and further in relation to the bore 36 during an extrusion operation. The wiper element 39 acts as a slide bearing between the barrel 34 and the guide rod 26 in providing support for the guide rod 26. There is tight contact between the guide rod 26, the wiper element 39, and the barrel 34.

Figure 4:
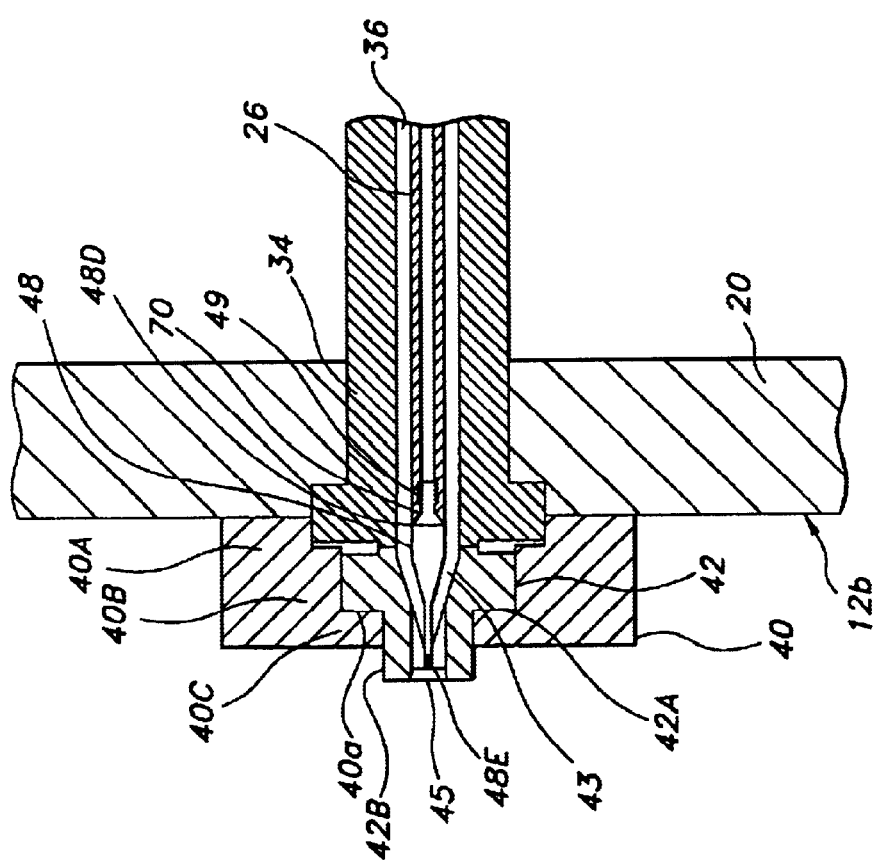
FIG. 4 shows an enlarged view of a die and mandrel used in connection with the subject invention.

As shown in FIGS. 1 and 2 and more particularly illustrated in the enlarged view of FIG. 4, a die mounting collar 40 having an opening 40a defined therethrough is annularly disposed about each of die 42 and a front extent of barrel 34 such that collar 40 concentrically supports the die 42 relative to the barrel 34. In particular, the die mounting collar 40 includes stepped portions 40A, 40B, 40C of increasingly-reduced diameters. The stepped portion 40A is formed to receive the front extent of the barrel 34 so that the die mounting collar 40 is concentrically aligned therewith. The stepped portion 40B is formed to receive enlarged end 42A of the die 42 with the stepped portion 40C being formed to allow the passage therethrough of the extrusion end 42B of the die 42. The fixed relationship of the stepped portions 40A, 40B, 40C allows for the die 42 to be concentrically aligned with the barrel 34 and provides holding force to minimize relative movement between the die 42 and the barrel 34. As a further enhancement, a positioning collar 80 may extend from the enlarged end 42A which is formed to coact with a positioning seat 82 formed in the front extent of the barrel 34. The stepped portions 40A, 40B, 40C and the coaction of the positioning collar 80 and the positioning seat 82 not only further provide for proper alignment between the die 42 and the barrel 34, but also provide additional holding force to maintain proper alignment of the die 42 and the barrel 34. To allow for placement of a pre-form into barrel 34, the die mounting collar 40 is removably mounted to the plate 20, preferably, using bolts.

Figure 4A:
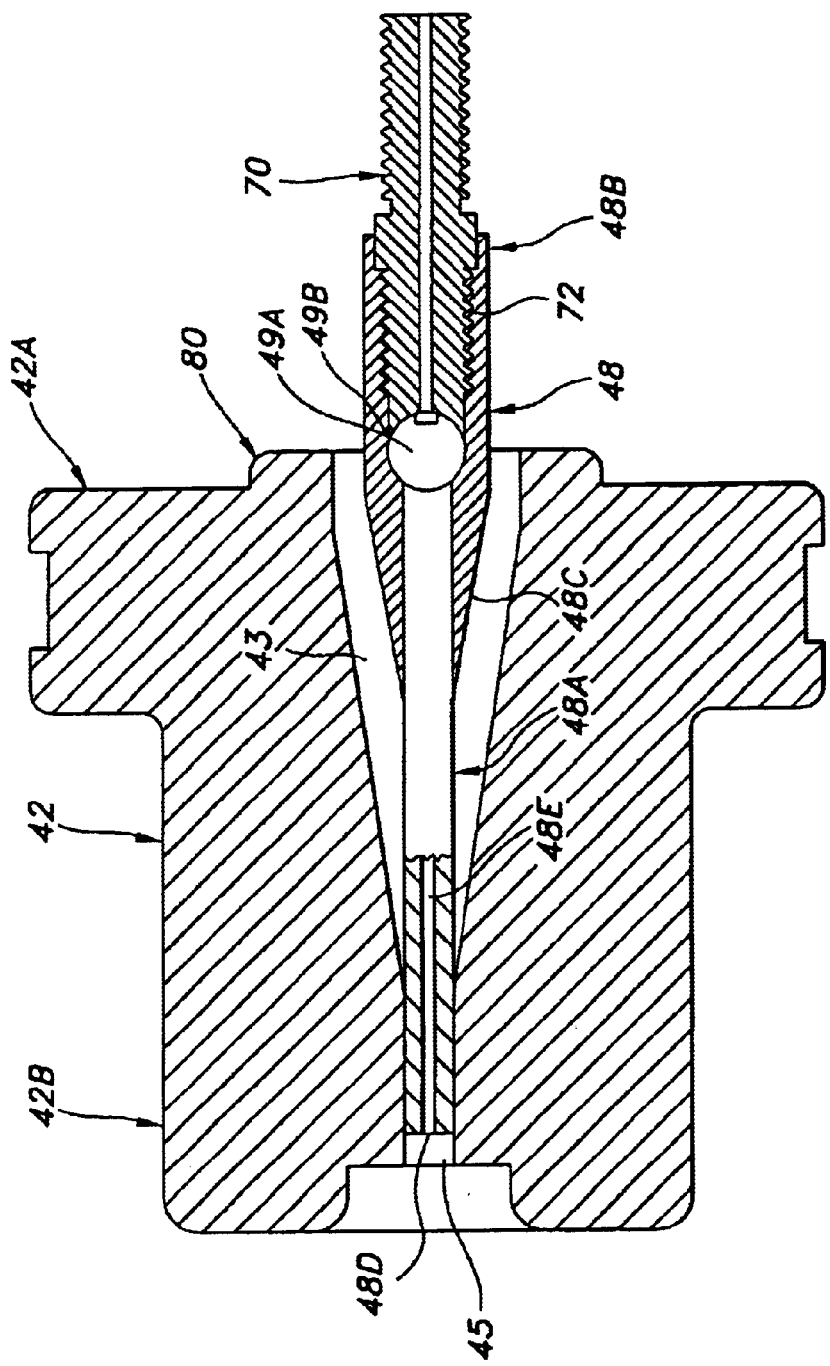
FIG. 4A shows an enlarged cross-sectional view of a die and mandrel used in connection with the subject invention.

With reference to FIG. 4A, die 42 includes a tapered extrudate passage 43 therethrough that terminates in a cylindrical extrudate exit opening 45. The parameters of the exit opening 45 are dictated by the desired dimensions of the extrudate to be formed and are partially defined by mandrel 48 about which the polymeric extrudate flows upon compression applied by the ram 30.

A tip portion of the guide rod 26 may define the mandrel 48, wherein the mandrel 48 is unitarily formed with the guide rod 26; or, more preferably, the mandrel 48 is formed to be removable from the guide rod 26. It may be desired to allow for easy removal of the mandrel 48, to allow for maintenance and/or easy loading of a billet pre-form of polymeric material. It is preferred that the mandrel 48 have a self-centering characteristic relative to the die 42.

In a preferred embodiment, as shown in FIG. 4A, the mandrel 48 is preferably formed from multiple parts 48A, 48B which are flexibly connected so as to allow relative movement therebetween. By way of non-limiting example, the first part 48A of the mandrel 48 is generally cylindrical having a ball-shaped joint member 49A formed at an end thereof. The second part 48B is formed with a socket 49B shaped to receive the ball-shaped joint member 49A in a ball-socket joint arrangement. Although the second part 48B has a tapered portion 48C which extends beyond the socket 49B thereby inhibiting the ability of the first part 48A to move relative to the second part 48B, the flexible connection of the ball-socket joint permits relative movement between the first and second parts 48A, 48B. The tapered portion 48C provides a smooth transition surface between the bore 36 and the exit opening 45 in partially defining the extrudate passage 43. It is therefore preferred that all surface direction changes found on the tapered portion 48C be defined by rounded or gradual transitions to avoid sharp edges or corners. Likewise, transitions in the passage 43 are to be gradual or rounded to avoid sharp edges or corners.

It is preferred that the second part 48B be rigidly mountable to the guide rod 26 (not shown in FIG. 4A). Accordingly, the first part 48A may move relative to not only the second part 48B, but also the guide rod 26. To facilitate mounting, a threaded stem 70 is formed to threadedly engage threads found on an internal surface of the guide rod 26. It is desired to achieve a smooth transition between the mandrel 48 and the guide rod 26 without any change in diameter. The threaded stem 70 may be unitarily formed with the mandrel 48, or, as shown in FIG. 4A, is threadedly received in a socket 72 in the mandrel 48.

During use, the mandrel 48 is responsive to the extrudate so as to be self-centering relative to the die 42. With the extrudate being slowly forced through the die 42 from a pre-form, the polymeric material is fed circumferentially about the first part 48 relatively evenly. Because of the steady and even feeding of material, the polymeric material urges the first part 48A into concentric alignment relative to the die 42. It should be noted that anomalies (e.g., lumps; bubbles) may be in the extrudate which are urged past the first part 48A, thus causing misalignment thereof. Although an anomaly will cause a possible deformity in the resulting extrudate (i.e., irregularity in wall thickness), the mandrel 48 will self-center after the anomaly passes through. Because of this self-centering featuring, extremely thin-walled tubes, having wall thicknesses of about 250 µm and less, can be formed. Prior art rigidly-fixed mandrels limit the thickness of the extrudate. Any off-center deviation with a rigidly-fixed mandrel results in a consistently improperly formed tube because of the rigid fixing (e.g., eccentric wall formation). Furthermore, with the repeated loading of pre-forms into a ram extruder, a self-centering feature of the mandrel 48 is highly desirable to correct for any misalignment in mandrel mounting.

As an alternative, the mandrel 48 can be unitary and mounted onto the guide rod 26 via a flexible connection so as to be movable relative thereto, as shown schematically in FIG. 4. For example, the mandrel 48 may be partially threaded onto the guide rod 26 via the stem 70, thereby allowing relative movement between the mandrel 48 and the guide rod 26. Any form of flexible connection known to those skilled in the art may be utilized (e.g., an elastic joint; a bellows connector).

Referring again to FIG. 1, to further enhance secure support of the plate 20, tertiary truss members 33 may be mounted in proximity to the barrel 34. The tertiary truss members 33 are preferably countersunk into the plate 20 and the platen 14 in similar fashion as the truss members 19 described below.

Piston cylinders 35 are mounted to and extend between the front plate 20 and the platen 14 with drive pistons 37 being slidably disposed within the piston cylinders 35. Stems 39 of the drive pistons 37 extend from the cylinders 35 and through the platen 18 via orifices 18d. The stems 39 are sealed within the orifices 18d to prevent leakage from the cylinders 35. Ends 41 of the stems 39 are countersunk into the traverse platen 16 in similar fashion to the securement of the truss members 19 described below. Beneficially, the cylinders 35 add additional rigidity to the assembly 12, along with the countersunk connections with the traverse platen 16.

The cylinders 35 are charged with any driving medium known to those skilled in the art, such as hydraulic fluid or air. It is preferred that hydraulic fluid be used and that the fluid be steadily and slowly charged into the cylinders 35. As such the ram 30, via the traverse platen 16, can be steadily driven towards the die 42.

In operation, a ram extrusion process is initiated in extruder 10 by placing a billet or pre-form of a polymeric composition (not shown) into the bore 36 of the barrel 34. To facilitate placement of the billet, it is preferred that the die 42 be formed to be removed from the front plate 20. The billet can then be inserted into the barrel 34. Driving motion (i.e., via hydraulic action of drive pistons 37) transmitted to plate 16 advances plate 16 along truss members 19 toward plate 18, thereby advancing ram 30 through barrel 34. Advancement of ram 30 inures translational movement to piston 38 and wiper element 39 along guide rod 26, maintaining guide rod 26 in concentric alignment with ram 30, mandrel 48, extrudate passage 43 and exit opening 45. Further advancement of ram 30 exerts pressure upon the polymeric billet until the billet becomes a flowable extrudate. The extrudate flows through extrudate passage 43 and exit opening 45 along a smooth outer periphery of mandrel 48 to define a tubular profile thereby.

Figure 5:
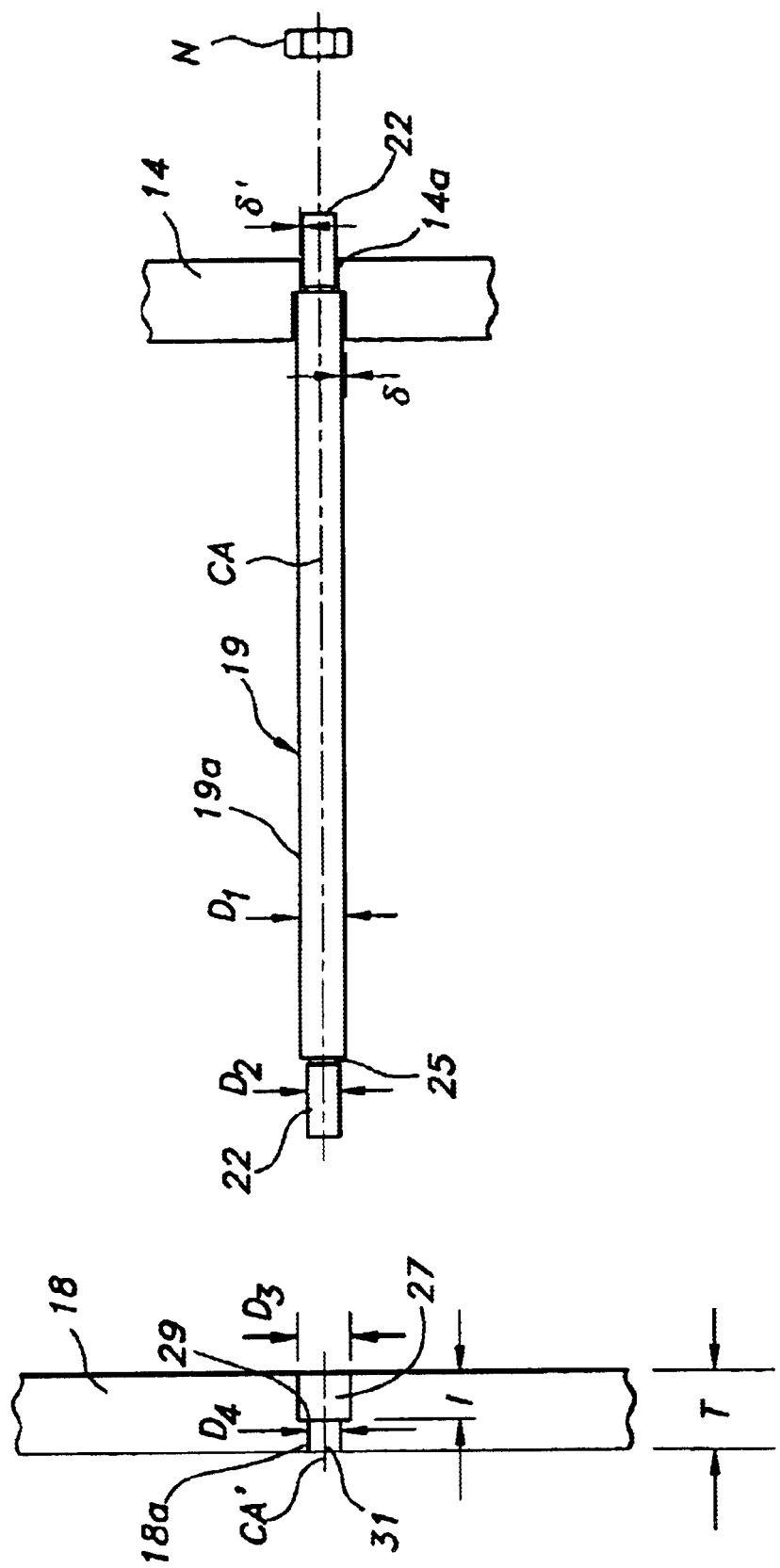
FIG. 5 shows a side view of a truss member used in connection with the subject invention.

As indicated, various connections in the extruder 10 are achieved with countersinking. To describe the countersinking connections, reference will be made to connections between the truss members 19 and the platens 14 and 18. It is to be understood that the other countersunk connections (i.e., the secondary truss members 23, the tertiary truss members 33, the piston stems 39) are formed dimensionally and structurally in the same fashion. With reference to FIG. 5, each of the truss members 19 is formed with the central body portion 19a, having a first diameter $D_1$, and end portions 22, each having a second diameter $D_2$ smaller than the diameter $D_1$. As a result of this structure, annular faces 25 are defined at the ends of the central body portion 19a which face outwardly. Preferably, the faces 25 are generally flat and perpendicularly disposed to a central longitudinal axis CA of the truss member 19. Correspondingly, the orifices 14a, 18a are each formed with a first diameter portion 27, an annular shoulder 29, and a reduced diameter portion 31. The first diameter portion 27 is formed with a diameter $D_3$ which is equal to the diameter $D_1$ plus a minimal clearance δ, while the reduced diameter portion 27 is formed with a diameter $D_4$ which is equal to the diameter $D_2$ plus a minimal clearance δ'. The clearances δ, δ' are set to allow for assembly of the elements, but it is preferred to keep such clearances to a minimum, especially the clearance δ. For example, with the diameter $D_1$ being equal to 2.0 inches (+0.0005/−0.0000 inches), the clearance δ is 0.001 inches (+0.0005/−0.000 inches) and thus the diameter $D_3$ is nominally 2.002 inches; whereas, with the diameter $D_2$ being equal to 1.75 inches (+0.01/−0.01), the clearance δ' is 0.05 inches (+0.005/−0.005), and thus the diameter $D_4$ is nominally 1.85 inches. The tendency of the truss members 19 to shift will be a function of the clearances δ, δ', and much more a function of the clearance δ'. In addition, the extent the central body portion 21 extends into the first diameter portion 27 not only dictates the extent to which the truss members 19 can shift, but, also, dictates the extent to which the truss members 19 are prevented from buckling (i.e., cause lateral deflection of the central body portion 19a). It is preferred that the central body portion 19a extend a length l into the platen with the length l being at least 33.3% of the thickness T of the platen (e. g., l is at least 1 inch, where T is 3 inches). All of the countersunk connections are formed with the same dimensional relationships. It is further preferred that the shoulder 29 be generally flat and disposed perpendicularly to a central axis CA of the respective orifice 14a, 18a.

In securing the truss members 19 to the platens 14, 18, the annular faces 25 are pressed into engagement with the shoulders 29, with the first diameter portions 27 partially accommodating the central body portions 19a and the end portions 22 extending through, and extending from, the reduced diameter portions 31. The bearing engagement of the truss members 19 with the orifices 14a, 18a, especially at the face 25/shoulder 29 interface and at the central body portion 21/first diameter portion 27 interface, constrains relative movement between the parts, including possible buckling of the truss members 19. To facilitate securing the truss members 19 to the platens 14, 18, the end portions 22 are at least partially threaded and nuts N are secured onto the end portions 22. Any securing means known to those skilled in the art may be utilized to secure the truss members 19 to the platens 14, 18.

It is further preferred that the platens 14, 16, 18 and the plate 20 be each formed of sufficient thickness so as to not deflect, twist, or shift relative to the truss members 19. As an exemplary embodiment, with the platens or plate being made of AISI 1060 steel, a thickness T of 3 inches may be provided.

Figure 6A:
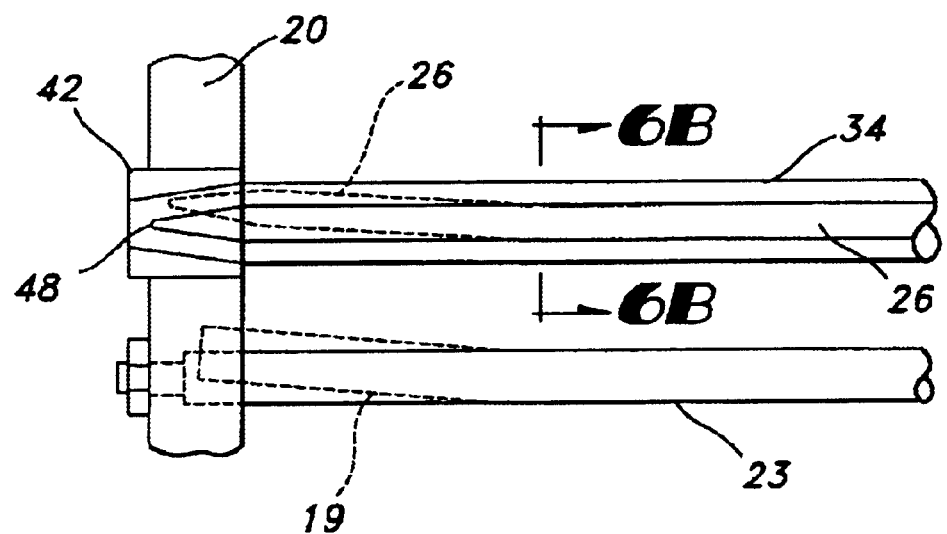
FIGS. 6(a) and 6(b) show cross sections of the guide rod and barrel with an annular gap being formed therebetween.
Figure 6B:
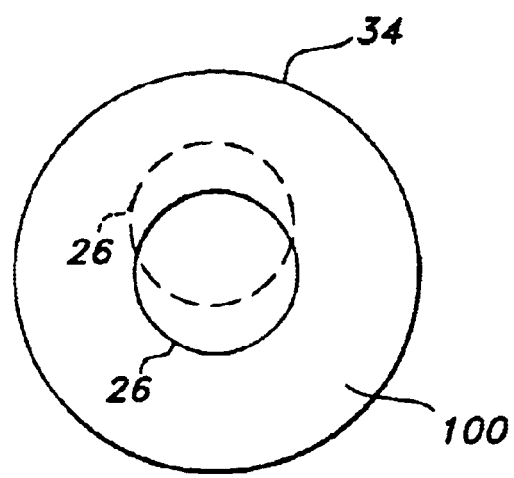

With the subject invention, extremely thin-walled tubular structures may be achieved desirably having a wall thickness less than or equal to about 250 $\mu$m and being longitudinally expandable to a value greater than or equal to 1000%. The subject invention is able to achieve extruded thin-walled members which are not fully self-supporting (in a cooled state). Because of the rigid securement of the plate 20 along with the platens 14, 16, 18, movement of the guide rod 26 is constrained during extrusion, thereby allowing the mandrel 48 to accurately self-center relative to the die 42, with the resulting extrudate being consistently formed uniformly (i.e., uniform wall thickness), even at such small wall thicknesses of less than, or about, 250 $\mu$m. Specifically, the guide rod 26 is constrainedly held at various points along its axial length, including by the platen 14, the traverse platen 16, and the wiper element 39 to maintain its position. As a result as shown in FIGS. 6(a) and 6(b), an annular gap 100 defined between the guide rod 26 and the barrel 34 is constantly maintained with the same dimensions. Consequently, the mandrel 48 is concentrically aligned relative to the die 42. With the guide rod 26 being constrainedly held in a property-aligned position, the mandrel 48 has a fixed reference point relative to which the self-centering function acts. As shown in dashed lines in FIGS. 6(a) and 6(b), if any of the truss members (19; 23; 33) were allowed to shift relative to the plate/platens and/or allowed to buckle, there will be relative movement between the guide rod 26 and the barrel 34, thereby affecting the dimensions of the annular gap 100. The subject invention greatly reduces and/or eliminates such relative movement.

It is important to note that the guide rod 26 need not be centrally located relative to the barrel 34. For example, an extrudate may be required with a thickened wall portion (i.e., an eccentric arrangement). The subject invention may also be utilized in this application. Advantageously, the extruder 10 allows for rigid securement of the key elements in allowing uniform extrusion—the holding arrangement need not be centrally held relative one element to another. With such an arrangement, the self-centering feature of the mandrel 48 need not be used.

With certain polymeric materials, e.g., PTFE, the tubular extrudate collapses upon exiting the opening 45 when extruded at thicknesses of about 250 $\mu$m or less. To overcome this problem, the tip 48D of the mandrel 48 is formed open and in communication with an open passage 48E extending through the mandrel 48. The passage 48E is defined through all parts of the mandrel 48 (e.g., the first part 48B; the second part 48C) and any connection members (e.g., the threaded stem 70). A stable medium is ejected from the tip 48D into the lumen of the extrudate to pressurize the lumen, and thus provide support. Preferably, the guide rod 26 is hollow and extends through the platen 18 allowing for a source of compressed air (80–100 p.s.i.g.) to be coupled thereto. The hollow lumen of the guide rod 26 is placed into communication with the passage 48E, and the compressed air is urged the length of the guide rod 26 and through the mandrel 48.

As further enhancements, the barrel 34 and/or the die 42 may be heated using conventional technology, such as, for example, resistance-wire heating elements.

Figure 7:
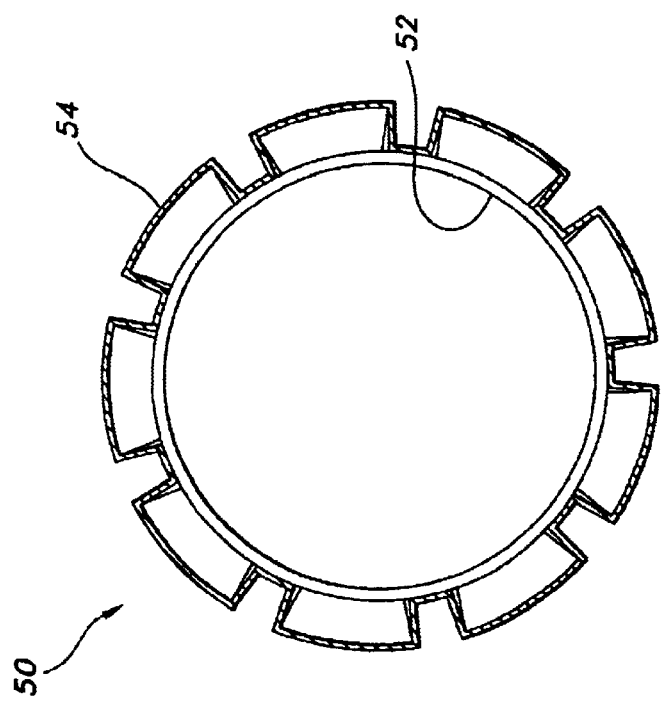
FIG. 7 shows a cross section of a tubular prosthesis incorporating extruded tubular members produced in accordance with the subject invention.

Extrusion apparatus 10 of the present invention is desirably well-suited to manufacture vascular prostheses having extremely thin walls, an example of which is shown in FIG. 7. As is evident from FIG. 7, prosthesis 50 is a tubular vascular conduit having each of an extruded luminal sheath 52 and an extruded PTFE exterior sheath 54 derived from extruder 10. Each sheath 52, 54 desirably has a thickness of less than or equal to about 200 $\mu$m (the sheaths 52, 54 are preferably formed from expanded PTFE (ePTFE) which is processed from unexpanded "green" tubes extruded by the extruder 10 of the subject invention).

An illustrative example of the operation of the present inventive extrusion apparatus and method is provided in the example below. It is emphasized that the values provided herein merely constitute an example of how the present inventive process can be completed, and that these values can be affected in view of material selection, desired tube thickness, piston velocity and related factors as described herein. It is therefore understood that any or all steps may be modified in sequence or duration to adapt to different applications.

EXAMPLE

With reference to extruding PTFE, ICI CD 123 resin is blended with isopar G lubricant at a ratio of 15.5. to 18% isopar by weight. The resin and lubricant are blended in a V-blender for approximately 15 minutes to form a paste thereby. A pre-former that compresses the paste into pre-form (i.e., cylindrical billets) is loaded with approximately 100 g of paste per pre-form. The paste is compressed into cylindrical pre-forms at hydraulic pressures ranging from 100 to 500 psi. Heat may be applied during compression in the range from about room temperature to about 125° F. It is preferred that the pre-forms be formed radially smaller than the bore 36 of the barrel 34. It is desired to obtain a clearance of 0.03125" (as measured on diameter) between the preform and the barrel 34.

After removal of the pre-forms from the pre-former, the pre-forms are loaded into the extruder 10 and extruded as described above, forming an axially oriented green PTFE tube with wall thickness ranging from about 100 to 250 microns. The hydraulic pressures applied during extrusion range between 200 and 500 psi. The pressure applied by the piston 38 to the pre-forms is in the range of about 800 to 900 p.s.i.g. The desirable reduction ratio (i.e., ratio of pre-form cross-sectional area to cross-sectional area of extruded tube) is in the range of 125 to 350. During the extrusion, the extruder die and barrel are heated from about 77° F. to about 125° F. As the extrudate exits the extruder die, air at 80–100 p.s.i.g. is injected into the lumen of the extrudate via the mandrel to maintain patency of the lumen. Upon take-up, the extrudate is lightly tensioned and cut into sections of pre-determined length, at which point the extrudate is called a "wet" green tube.

With respect to the present inventive extruder, concentric alignment of the mandrel is obtainable in both static (i.e., no pressure) and dynamic (i.e., pressure application) portions of an extrusion cycle. Alignment of the mandrel, die, barrel and ram is maintained by the parallel orientation of the platens that is achieved by countersinking of truss members thereinto and the self-centering feature of the mandrel. Thin-walled PTFE tubes are thereby consistently derived from the extruder so as to decrease variability in the final product. Such predictable and uniform production further increases manufacturing yields and facilitates assembly, maintenance and cleaning of the extruder device between extrusion cycles.

Various changes and modifications can be made to the present invention. It is intended that all such changes and modifications come within the scope of the invention as set forth in the following claims.

What is claimed is:

1. An apparatus for extrusion of at least one thin-walled tubular member from a pre-form of polymeric material, said apparatus comprising:

an extrudate die having an orifice formed therethrough;

a barrel having a bore in communication with said orifice;

a piston slideably disposed in said bore;

a ram mounted to said piston; and a guide rod extending through said bore, said guide rod being constrained so as to maintain a relatively constant annular gap between said barrel and said guide rod, wherein said guide rod is hollow and coupled to a source of a pressurized stable medium.

2. An apparatus as in claim 1, wherein said guide rod being constrainedly held by at least two locations spaced-apart along the length of said guide rod.

3. An apparatus as in claim 1 further comprising a first platen disposed transversely to said guide rod, said guide rod being constrainedly held by said first platen.

4. An apparatus as in claim 3 further comprising a second platen spaced from and arranged generally parallel to said first platen, said ram and said guide rod passing through said second platen.

5. An apparatus as in claim 4 further comprising a plurality of truss members extending between and connecting said first and second platens.

6. An apparatus as in claim 5, wherein at least one of said truss members is formed to extend along a longitudinal axis, said truss member having a central body portion and a first end portion, said first end portion being formed cross-sectionally smaller than said central body portion.

7. An apparatus as in claim 6, wherein said first platen is formed with at least one first orifice, said truss member passing through said first orifice, said first orifice having a first diameter portion registering with a first portion of said central body portion, and a reduced diameter portion registering with said first end portion.

8. An apparatus as in claim 7, wherein said first platen is formed with a thickness, said first portion of said central body portion having a length of a least 33.3% of said thickness.

9. An apparatus as in claim 7, wherein said truss member is formed with a second end portion cross-sectionally smaller than said central body portion, and wherein said second platen is formed with at least one second orifice, said truss member passing through said second orifice, said second orifice having a second diameter portion registering with a second portion of said central body portion, and a second reduced diameter portion registering with said second end portion.

10. An apparatus as in claim 9, wherein said second platen is formed with a second thickness, said second portion of said central body portion having length of at least 33.3% of said second thickness.

11. An apparatus as in claim 6, wherein said second platen is formed with at least one second orifice, said truss member passing through said second orifice, said second orifice having a second diameter portion registering with a first portion of said central body portion, and a second reduced diameter portion registering with said first end portion.

12. An apparatus as in claim 11, wherein said second platen is formed with a thickness, said first portion of said central body portion having a length of a least 33.3% of said thickness.

13. An apparatus as in claim 5, wherein a traverse platen is slidably disposed on said trusses, said ram being coupled to said traverse platen.

14. An apparatus as in claim 13 further comprising drive pistons coupled to said traverse platen to impart driving forces thereto.

15. An apparatus as in claim 14, wherein said drive pistons have stems coupled to said traverse platen, wherein at least one of said stems is formed to extend along a longitudinal axis, said stem having a central body portion and an end portion, said end portion being formed cross-sectionally smaller than said central body portion.

16. An apparatus as in claim 15, wherein said traverse platen is formed with at least one orifice, one of said stems passing through said orifice, said orifice having a first diameter portion registering with a first portion of said central body portion, and a reduced diameter portion registering with said end portion.

17. An apparatus as in claim 16, wherein said traverse platen is formed with a thickness, said first portion of said central body portion having a length of a least 33.3% of said thickness.

18. An apparatus as in claim 5 further comprising a front platen spaced from and arranged generally parallel to said second platen, said extrudate die being mounted to said front platen.

19. An apparatus as in claim 18 further comprising a plurality of secondary truss members extending between and connecting said second platen and said front platen.

20. An apparatus as in claim 19, wherein at least one of said secondary truss members is formed to extend along a longitudinal axis, said secondary truss member having a central body portion and a first end portion, said first end portion being formed cross-sectionally smaller than said central body portion.

21. An apparatus as in claim 20, wherein said second platen is formed with at least one second orifice, said secondary truss member passing through said second orifice, said second orifice having a first diameter portion registering with a first portion of said central body portion, and a reduced diameter portion registering with said first end portion.

22. An apparatus as in claim 21, wherein said second platen is formed with a thickness, said first portion of said central body portion having a length of a least 33.3% of said thickness.

23. An apparatus as in claim 21, wherein said secondary truss member is formed with a second end portion cross-sectionally smaller than said central body portion, and wherein said front platen is formed with at least one front orifice, said secondary truss member passing through said front orifice, said front orifice having a second diameter portion registering with a second portion of said central body portion, and a second reduced diameter portion registering with said second end portion.

24. An apparatus as in claim 23, wherein said front platen is formed with a thickness, said second portion of said central body portion having a length of at least 33.3% of said thickness.

25. An apparatus as in claim 20, wherein said front platen is formed with at least one front orifice, said secondary truss member passing through said front orifice, said front orifice having a second diameter portion registering with a first portion of said central body portion, and a reduced diameter portion registering with said first end portion.

26. An apparatus as in claim 25, wherein said front platen is formed with a thickness, said first portion of said central body portion having a length of a least 33.3% of said thickness.

27. An apparatus as in claim 19, wherein at least a portion of said secondary truss members are located in proximity to said barrel.

28. An apparatus as in claim 4, said guide rod being constrainedly held by said second platen.

29. An apparatus as in claim 1 further comprising a wiper element, said guide rod being constrainedly held by said wiper element.

30. An apparatus as in claim 1, wherein said stable medium is air.

31. An apparatus as in claim 1, wherein said guide rod is centrally disposed within said barrel.

32. An apparatus as in claim 1, wherein said extrudate die is removable.

33. An apparatus as in claim 1, wherein said extrudate die is heated.

34. An apparatus as in claim 1, wherein said barrel is heated.

35. An apparatus as in claim 1, further comprising a flexible mandrel connected to said guide rod.

36. An apparatus as in claim 35, wherein said mandrel at least partially extends into said orifice of said extrudate die.

37. An apparatus as in claim 35, wherein said mandrel includes first and second portions, said first and second portions being flexibly connected.

38. An apparatus as in claim 37, wherein said first and second portions are flexibly connected via a ball and socket joint with said first portion being formed at one end with a ball-shaped joint portion, said ball-shaped joint portion being receivingly disposed in a socket formed in said second portion.

39. An apparatus as in claim 37, wherein said second portion is rigidly mountable onto said guide rod.

40. An apparatus as in claim 39, wherein said second portion is threadedly mountable onto said guide rod.

41. An apparatus as in claim 1, further comprising a mandrel flexibly connected to said guide rod.

42. An apparatus as in claim 41, wherein said mandrel at least partially extends into said orifice of said extrudate die.

43. An apparatus as in claim 41, wherein said mandrel is partially threaded onto said guide rod.

44. An apparatus for extrusion of at least one tubular member, said apparatus comprising:
    an extrudate die having an orifice formed therethrough;
    a barrel having a bore in communication with said orifice;
    a guide rod extending through said bore; and,
    a flexible mandrel connected to said guide rod, wherein at least a portion of said mandrel is movable relative to said guide rod.

45. An apparatus as in claim 44, wherein said mandrel at least partially extends into said orifice of said extrudate die.

46. An apparatus as in claim 44, wherein said mandrel includes first a second portions, said first and second portions being flexibly connected.

47. An apparatus as in claim 46, wherein said first and second portion are flexibly connected via a ball and socket joint with said first portion being formed at one end with a ball-shaped joint portion, said ball-shaped joint portion being receivingly disposed in a socket formed in said second portion.

48. An apparatus as in claim 46, wherein said second portion is rigidly mountable onto said guide rod.

49. An apparatus as in claim 48, wherein said second portion is threadedly mountable onto said guide rod.

50. An apparatus as in claim 45, wherein said mandrel is movable relative to said orifice.

51. An apparatus for extrusion of at least one tubular member, said apparatus comprising:
    an extrudate die having an orifice formed therethrough;
    a barrel having a bore in communication with said orifice;
    a guide rod extending through said bore; and,
    a mandrel flexibly connected to said guide rod such that said mandrel is movable relative to said guide rod.

52. An apparatus as in claim 51, wherein said mandrel at least partially extends into said orifice of said extrudate die.

53. An apparatus as in claim 51, wherein said mandrel is partially threaded onto said guide rod.

54. An apparatus as in claim 52, wherein said mandrel is movable relative to said orifice.

* * * * *